United States Patent [19]

White

[11] Patent Number: 5,367,475
[45] Date of Patent: Nov. 22, 1994

[54] MOVING VEHICLE CLASSIFIER WITH ITERATIVE DECONVOLVER ESTIMATOR

[75] Inventor: Stanley A. White, San Clemente, Calif.

[73] Assignee: Rockwell International Corporation, Seal Beach, Calif.

[21] Appl. No.: 76,077

[22] Filed: Jun. 11, 1993

Related U.S. Application Data

[63] Continuation-in-part of Ser. No. 763,710, Sep. 23, 1991, abandoned.

[51] Int. Cl.[5] ............................................. G06F 15/31
[52] U.S. Cl. .................................................. 364/724.01
[58] Field of Search ...................... 364/724.01, 724.12, 364/724.19, 724.2, 728.01, 728.02; 375/11

[56] References Cited

U.S. PATENT DOCUMENTS

| | | | |
|---|---|---|---|
| 4,797,923 | 1/1989 | Clarke | 364/724.12 X |
| 4,837,723 | 6/1989 | Peacock | 364/724.01 |
| 4,934,768 | 7/1983 | Sari | 364/724.2 X |

*Primary Examiner*—Tan V. Mai
*Assistant Examiner*—Chuong D. Ngo

*Attorney, Agent, or Firm*—H. Fredrick Hamann; George A. Montanye; Tom Streeter

[57] ABSTRACT

A MOVING VEHICLE CLASSIFIER WITH ITERATIVE DECONVOLVER ESTIMATOR deconvolves a signal in which a plurality of sensed signals, which originate from a common signal source (namely, a moving vehicle) and traverse differing signal paths, are used to formulate an initial unconstrained estimation of the signal source as a reference signal. Preselected constraints are placed on the reference signal to generate an estimate of the source signal, and of a source signal matrix, for the plurality of input sensors. A pseudoinverse of the source matrix is then used to form an estimate of the impulse response of the propagation paths for the signals. The estimates of signal path impulse response are used in combination with the input signals to again estimate the unconstrained reference signal. This is in turn used to estimate a new source signal matrix and path responses. These estimation steps are repeated in a series of iterative steps until a point of minimum variance from the received signals is reached. At this point, the source signal estimation is chosen as a deconvolved signal output. The moving vehicle which produced the source signal may then be classified by conventional means.

6 Claims, 4 Drawing Sheets

MOVING VEHICLE CLASSIFIER WITH ITERATIVE DECONVOLVER ESTIMATOR

The present application is a continuation-in-part of Applicant's parent application, Ser. No. 07/763,710, filed September 23, 1991, titled AN ITERATIVE DECONVOLVER ESTIMATOR, now abandoned. The disclosure of the parent application is incorporated herein by reference.

BACKGROUND OF THE INVENTION

The present invention relates to apparatus and methods for classifying a signal source, namely, a moving vehicle, both as a moving vehicle and as a class of moving vehicle from estimates of its length, weight, speed, direction, etc. This involves signal processing and, more particularly, involves deconvolving received data into an underlying source signal. It further involves estimating the impulse signal model for the common source of one or more received signals.

There are many advanced signal processing applications in which one wishes to estimate the characteristics of a signal source from received signals. Given sufficient information, time, and processing power, a signal can be deconvolved into its source signal through compensation for various influences such as the propagation path. Alternatively, for known source signals the characteristics of the signal path can be derived. This latter technique is used extensively in geological subsurface mapping.

While the art has developed extensive tools for signal source and path analysis, these tools generally are very complex and difficult to apply. The computational schemes employed are computationally intensive and highly complex, often requiring large computer systems operating over many hours or days to derive a useful estimate. The complexity of the approaches taught or known in the art can be seen in reference works in the area such as: "Maximum Likelihood Deconvolution", by J. M. Mendel, Springer-Verlag, N.Y. Inc. 1990; "Signal Processing: The Model-Based Approach" by James V. Candy, McGraw-Hill 1986; or "Lessons in Estimation Theory" by J. M. Mendel, Prentice Hall, Inc. 1987.

For power-limited portable or mobile applications such complexity is unsatisfactory. At the same time, in many applications only a small amount of information for signal and path parameters is known, making application of the more complex and complete approaches impractical. Many signal detection and analysis applications also require that the analysis time be short, with real-time estimation being preferred. The art has not provided a technique meeting these constraints which also provides a highly accurate estimate.

What is needed then is a low power, high speed technique for classifying a moving vehicle by deconvolving received data signals, the technique also being able to account for the intervening signal path dynamics. It would be advantageous if the technique could be achieved with minimum complexity and cost.

SUMMARY OF THE INVENTION

In view of the limitations in the art in estimating or deconvolving a signal from a moving vehicle, one purpose of the invention is to provide a new technique for approximating a maximum likelihood deconvolution of a moving vehicle source signal from received signal data.

An advantage of the invention is that the signal source is estimated very rapidly without actual knowledge of the signal transfer path.

A second advantage of the invention is that signal deconvolution and transfer-path impulse response estimation are achieved simultaneously, quickly and simply.

A third advantage of the invention is that signal deconvolution is achieved using very low computational power.

These and other purposes, objects, and advantages are realized in a method and apparatus for performing iterative approximation to a maximum-likelihood signal deconvolution. A plurality of sensed signals which originate from a common signal source (namely, a moving vehicle) and traverse differing signal paths (including different sensor receptors) are used to formulate an initial unconstrained estimate of the signal source as a reference signal. Preselected constraints are placed on the reference signal to generate a constrained estimate of the source signal and a source signal matrix for the plurality of input sensors. A pseudoinverse of the source matrix is then used to form an estimate of the impulse response of the propagation path or medium for the signals. The estimates of the signal path impulse response are used in combination with the input signals to again estimate the unconstrained reference signal which is in turn used to estimate a new constrained source signal matrix and path responses. These estimation steps are repeated until a point of minimum variance from, or convergence to, the received signals is reached. At this point, the constrained source signal estimate is chosen as a deconvolved signal output.

This method is accomplished using a signal-deconvolver apparatus in which at least two input signals, which are generated by detecting a source signal along at least two substantially separate signal paths, are received by an input element and transferred to a reference-signal generator. The input signals and related impulse responses are generally processed as signal vectors. Using the input signals, the reference signal generator creates a first approximation reference signal which is an unconstrained estimate of the source signal.

The number of available input signals generally exceeds the capacity of the deconvolver. If P is the capacity of the deconvolver, then the block of P contiguous signals which has the greatest energy is selected for further processing.

Since the path impulse responses are unknown during process initialization, the initial reference estimate typically uses only the input signals to form the reference signal. This is accomplished using techniques such as the square root of the sum of the squares of the input signal vector components. However, when previously determined or estimated path impulse response values are available, such as where they are stored in a memory element, they are used as modifying coefficients in forming the initial reference signal. The initial reference signal will then be formed in the same manner as the subsequent reference signals are formed.

An exemplary reference-signal generator uses a matrix compilation element for forming an estimated path-response matrix for each estimated path impulse response and a transposition element for transposing the resulting matrix. Each transposed matrix is multiplied by a corresponding input signal vector in a first multiplier to form a first product and by the estimated path matrix in a second multiplier to form a second product.

Summation elements are used to sum all first and second products, respectively. Each path-response matrix is premultipled by its transpose and the products are summed. The second resulting addend is inverted in a matrix inversion element and then post-multiplied by the first sum.

Predetermined constraints are imposed on the resulting reference signal in a source estimation element so as to form an estimated source signal matrix for the plurality of input signals. This is accomplished by using a signal comparison element to compare the reference signal to a plurality of prestored sample source signals and select one of the prestored sample signals as a best fit match to the reference as an estimated source signal. The signal constraints can also be applied by performing peak picking on the reference signal so as to estimate locations of pulse peaks in the source signal, and then using an output element to generate an output pulse sequence having pulses spaced apart relative to each other corresponding to locations for detected peaks. All sample values except the peaks are forced to zero. Since P generally exceeds M, the duration of the source signal in measuring intervals, the block of M contiguous signals which has the greatest energy is selected for further processing. The remaining P-M signals are discarded.

The constrained output is an estimated sample signal matrix for the plurality of input signals. A matrix pseudo inversion element, connected to receive the output of the source matrix element, forms a pseudoinverse of the estimated source signal matrix. The estimated source-signal matrix is then used to tailor each of the received input signals to form a respective new path impulse response estimate for each of the input signals. This is accomplished by premultiplying each of the input vectors by the pseudoinverse matrix in a multiplication element.

A plurality of estimated input signals is formed by applying each new path impulse response estimate to the estimated source signal using a second multiplication element. The convergence of the estimated signals to the input signals is then measured and the most current estimated source signal is selected as a deconvolved source signal when the convergence has obtained a minimum value. Otherwise, a new reference signal is generated employing the input signals and the new estimated path impulse responses and the new reference used to create a new source signal matrix. The source signal, pseudoinverse matrix, impulse responses, and estimated inputs are iteratively generated until the convergence has reached a minimum.

The convergence is measured by forming a difference between each of the input signals and a corresponding estimated input signal in a first summation and then summing all of the signal differences to form a convergence measure in a second summation element.

In further aspects of the invention, a second set of estimated input signals is formed using the unconstrained reference signal and estimated path impulse responses and a second convergence measurement is obtained. This is preferably accomplished by premultiplying the reference signal vector by each of the new path impulse response matrix estimates to form a plurality of second estimated input signals. A plurality of third summation elements is used to form a second difference between each of the input signals and a corresponding second estimated input signal. A fourth summation element then sums all of the second signal differences to form a second convergence measure. A convergence detection element is then used to determine when both the first and second the convergences have obtained or are limit cycling about their minimum values. At this point, the estimated source signal is selected as a deconvolved source signal. Otherwise, the new reference signal is generated and the iterative process repeated.

Where desired, the resulting estimated source signal, reference signal, estimated path impulse responses, and any generated matrices can be stored for later retrieval or transferred to other apparatus for analysis. The selected estimated signal source can be acted upon to provide one or more desired signal or event parameters.

DETAILED DESCRIPTION OF A PREFERRED EMBODIMENT

The present invention performs deconvolution of a signal which is the convolution of an unknown pulse sequence and a propagation medium. This is accomplished by generating an estimate of the unknown source signal impulse sequence, an associated pseudoinverse matrix, and the impulse response of the intervening propagation path or medium. These estimates are then used to generate new estimated input data which are compared to the actual input data. The estimate and comparison steps are performed iteratively until a minimum variance from, or convergence to, the actual input data is reached. At this point, the most recent source signal estimate is considered an optimized solution and is chosen as a deconvolved signal output. Where desired, the latest estimates for path impulse response may also be stored or transferred for later use.

The method of the invention is applicable to signal deconvolution wherein the process or signal source provides signals, by output or detection, that can be modeled as an impulse sequence. A variety of signals and signal sources fit this categorization. One exemplary application would be to deconvolve signals received from sensors used to collect information about vehicles such as trains traveling along a railroad or heavy wheeled vehicles traversing roads. Other exemplary processes include events such as, but not limited to, acoustic detection of periodic signals from machinery (e.g., a ship propulsion system) where identification of the driving signal (engine type) and propagation path are equally important. In any case, the invention is used to analyze process or event which generates the sensor signals to estimate one or more source characteristics or parameters. For the vehicle example above, such estimates would be direction of movement, vehicle length, weight distribution, and speed.

One or more application-specific sensors or detectors are used to receive source signals, as altered by any intervening propagation path aberrations, or sensor dynamics, and provide an output indicative of the received signal. In the vehicular example a motion sensitive instrument such as a tiltmeter or similar device is used adjacent to or within the road bed to generate signals when the vehicle passes nearby. The tiltmeter generates output information indicating changes in the slant or micro-topography of the local terrain in response to the movement over or change in weight applied to the roadbed. This generates signals indicative of changes along an X axial direction and a Y axial direction.

This exemplary output scheme is for purposes of illustration only, and additional axis of motion or information can be present such as in x, y, z coordinate changes or various displacement angles, et cetera, dependent upon the type of processes being analyzed and the sensor data available. Additional signals, more than two, provide more signal source signatures and a more robust and exacting deconvolution solution.

In the present example of a vehicular train or convoy, the support points of the cars in the overall vehicular train each provide the sensor, or sensors, with a sample signal that acts as one impulse in a series of impulses to form a pulse sequence. The sensor signal samples can be treated as an M-dimensional pulse sequence which can be modeled by a signal vector $s^o$ which equals $[s^o_0, s^o_1, s^o_2, \ldots, s^o_{M-1}]^T$. The length of this model signal vector generally corresponds to that of the source signal plus an additional length of about fifty percent of the individual pulses (here train cars) within the pulse sequence added at both the beginning and end. If the sampling interval is coarse compared to the target resolution of the constrained reference signal, the reference samples which we generate are the convolution of an inverse Kaiser-Bessel or Dolph-Chebychev pulse with the impulse sequence of an ideal train. Otherwise we can use a pulse sequence quantized to the nearest sample slot. The impulse sequence model signal vector is a function of the velocity of the sensed vehicle which relates the spatial separation of the impulses with a sensed time separation of the individual pulses within the pulse sequence. The sensor output along any axis is a compilation of sample signal vector components, $s^o_0, s^o_1, s^o_2, \ldots, s^o_{m-1}$, received up to that time, adjusted by a coefficient which represents the impulse response of the signal transfer path. This process involves the reception of not only the original signal vector but various time delayed or alternate path versions of the same signal which are folded into the original signal at each subsequent output time. This is the result of a moving signal source or other multi-path effects. For a series of output signal vector components $x^o_{M-1}$ this process can be expressed as:

$$x_0^0 = s_0^0 c_0^0$$

$$x_1^0 = s_1^0 c_0^0 + s_0^0 c_1^0$$

$$x_2^0 = s_2^0 c_0^0 + s_1^0 c_1^0 + s_0^0 c_2^0$$

.
.
.

$$x_{M-1}^0 = s_{M-1}^0 c_0^0 + s_{M-2}^0 c_1^0 + \ldots + s_{M-N}^0 c_{N-1}^0$$

.
.
.

$$x_{P-2}^0 = 0 + 0 + 0 + \ldots + s_{M-1}^0 c_{N-2}^0 + s_{M-2}^0 c_{N-1}^0$$

$$x_{P-1}^0 = 0 + 0 + 0 + \ldots + 0 + s_{M-1}^0 c_{N-1}^0$$

The sensor outputs occurring at a later time, where $n > M-1$, show no contributions from the original input signal but are still receiving later delayed signal components. Therefore, the output is modeled as a series of zero value terms being summed with the later received signal components.

Each signal (measurement) propagation path is modeled as a finite impulse response (FIR) filter, and the characteristics of the FIR filter, or FIR filter taps, are estimated. This modeling can be expanded to view an output signal vector as the convolution of the vector signal input with a filter coefficient vector or, in the alternative, as a FIR coefficient vector post-multiplying a signal matrix. The signal matrix would be expressed as a series of matrix columns that comprise vertically, time-displaced replicas of the sample vector $s^o$, as shown above. As illustrated by the $x^o$ outputs from before, the successive columns of the matrix will contain shifted versions of the original input sample vector signal. Therefore, the elements of the sample matrix $[S^o]$ become:

$$s_{pn}^0 = \begin{cases} 0 \text{ if } n > p \text{ or } p > M - 1 + n \\ s_{p-n}^0 \text{ otherwise} \end{cases}$$

where $p \leq P$ and P is the total number of samples received on each axis, or the maximum or highest value if the different axis values are unequal, such that:

$$P = M + N - 1,$$

and where N is the number of samples used to model the signal-propagation filters (path). Capitalization (even without brackets) is sometimes used herein to indicate a matrix; lower case indicates a vector or scalar. The number of samples is determined by the specific application for the signal deconvolution based on sensor dynamics, memory, noise, etc.; P is determined independently from the present invention. The form of $[S^o]$ is expressed as:

$$\begin{bmatrix} s^o_0 & 0 & 0 & 0 & \cdots & 0 & 0 \\ s^o_1 & s^o_0 & 0 & 0 & \cdots & 0 & 0 \\ s^o_2 & s^o_1 & s^o_0 & 0 & \cdots & 0 & 0 \\ \vdots & \vdots & \vdots & \vdots & \ddots & 0 & 0 \\ \vdots & \vdots & \vdots & \vdots & & 0 & 0 \\ \vdots & \vdots & \vdots & \vdots & & 0 & 0 \\ s^o_{N-2} & s^o_{N-3} & s^o_{N-4} & s^o_{N-5} & \cdots & s^o_0 & 0 \\ s^o_{N-1} & s^o_{N-2} & s^o_{N-3} & s^o_{N-4} & \cdots & s^o_1 & s^o_0 \\ \vdots & \vdots & \vdots & \vdots & & \vdots & \vdots \\ s^o_{M-1} & s^o_{M-2} & s^o_{M-3} & s^o_{M-4} & \cdots & s^o_{M-N+1} & s^o_{M-N} \\ 0 & s^o_{M-1} & s^o_{M-2} & s^o_{M-3} & \cdots & s^o_{M-N+2} & s^o_{M-N+1} \\ 0 & 0 & s^o_{M-1} & s^o_{M-2} & \cdots & s^o_{M-N+3} & s^o_{M-N+2} \\ \vdots & \vdots & \vdots & \vdots & & \vdots & \vdots \\ \vdots & \vdots & \vdots & \vdots & & \vdots & \vdots \\ 0 & 0 & 0 & 0 & \cdots & s^o_{M-1} & s^o_{M-2} \\ 0 & 0 & 0 & 0 & \cdots & 0 & s^o_{M-1} \end{bmatrix}$$

The source signal from any process has one or more signal paths it traverses or along which it propagates before being detected, including the instrument dynamics of any sensor. In the present example this would comprise the falls, roadbed, ground, and the tiltmeter structure itself. Propagation paths from the source to the sensor, here tiltmeter, output signals are conveniently modeled as N-sample-duration propagation filters having coefficient vectors which are used to modify the sample signals. In the present example, the X- and Y-axis output signals are modeled by two such N-sample-duration propagation filters $c^o$ and $d^o$ (the two signal paths) whose coefficient vectors are expressed as:

$$[c^o = [c^o{}_0, c^o{}_1, c^o{}_2, \ldots, c^o{}_{N-1}]^T,$$

$$d^o = [d^o{}_0, d^o{}_1, d^o{}_2, \ldots, d^o{}_{N-1}]^T,$$

respectively. For computational convenience one can also define a pair of (P×M)-dimensional matrices $[C^o]$ and $[D^o]$ comprising the series of path vectors that arise from the time delayed effects of multiple signal paths. As in the case of the sample signal matrix $[S^o]$, the columns of the $[C^o]$ and $[D^o]$ matrices are vertically displaced versions of the $c^o$ and $d^o$ vectors with trailing and leading zeroes added for completeness. The elements of these matrices are expressed as:

$$C^0_{pm} = \begin{cases} 0 \text{ if } m > p \text{ or } p > N - 1 + m \\ c^0_{p-m} \text{ otherwise} \end{cases}$$

and $$D^0_{pm} = \begin{cases} 0 \text{ if } m > p \text{ or } p > N - 1 + m \\ d^0_{p-m} \text{ otherwise}. \end{cases}$$

The signals generated at the two sensor outputs can then be expressed as:

$$x^o = S^o]c^o = [C^o]s^o,$$

and $$y^o = [S^o]d^o = [D^o]s^o;$$

where $$x^o = [x^o{}_0, x^o{}_1, x^o{}_2, \ldots, x^o{}_{P-1}]^T,$$

and $$y^o = [y^o{}_0, y^o{}_1, y^o{}_2, \ldots, y^o{}_{P-1}]^T,$$

either form of which can be used to derive a maximum likelihood deconvolved source signal.

Additional signals, if available, provide additional impulse response factors and vectors $z^o$:

$$z^o = [z^o{}_0, z^o{}_1, z^o{}_2, \ldots, z^o{}_{N-1}]^T,$$

which, when combined with the definitions above, would also provide additional path matrices of the form:

$$Z^0_{pm} = \begin{cases} 0 \text{ if } m > p \text{ or } p > N - 1 + m \\ z^0_{p-m} \text{ otherwise} \end{cases}$$

where the corresponding input data is $n^o$ and $$n^o = [S^o]Z^o = [Z^o]s^o.$$

A sample or source signal $s^o$ can be estimated from a given set of input data signals or measurements $x^o$ and $y^o$. However, to do so involves not only the input signals $x^o$, $y^o$, but the $i^{th}$ estimates of the path response vectors $c^i$ and $d^i$ and a basic starting reference point which is defined as a new reference vector $r$. The reference vector $r$ is a useful tool in developing an estimate of $s^o$ and, during operation of the invention, is derived from a combination of the input data and estimated path impulse response vectors, as shown below. However, the initial component values for the reference vector $r^o$ are typically generated using only the input signal vectors $x^o$ and $y^o$, since estimates for the vectors $c^i$ and $d^i$ do not yet exist.

A variety of analytical approaches can be used to define $r^o$ from the received signals. Experience with specific applications will tend to provide an appropriate basis for selection of a preferred approach. For example, it is often found useful to commence with a simple square root of the sum of the squares (RSS) of the components of the $x^o$ and io vectors. Alternatively, the input signal vectors can interact with previously stored templates or other constraint imposing factors to provide $r^o$. An example of this approach would be the use of previously estimated or defined values for the vectors $c^i$ and $d^i$ as values for the vectors $r^o$ and $d^o$. Therefore, $d^o$ and $d^o$ can be used in the same process as $c^i$ and $d^i$ discussed below to generate $r^o$. Experience or prior understanding of a specific device application will provide this ability to generate a reasonable estimate as a result of previous analysis or data.

The $i^{th}$ estimates of the remainder of the vector set (where i is an integer greater than zero) are denoted as $x^i$ $y^i$, $c^i$, $d^i$, and $r^i$ with the corresponding matrices denoted as $[C^i]$, $[D^i]$, and $[S^i]$. The first estimate of the $s^o$ vector is $s^1$, the second is $s^2$ and so forth to the $i^{th}$ estimate which is $s^i$. However, as will become apparent, the vector $s^i$ is determined using the reference vector $r^{i-1}$.

The estimates for these vector quantities, and thus the source signal process, are generated iteratively as disclosed above. The six vectors comprise a vector set which must be estimated during every cycle of the estimation process which occurs after one set of data is received and before further data is analyzed. During each iteration cycle the path response vectors $c^i$ and $d^i$ are estimated and then used with the input data to form a new sample signal vector and pseudoinverse matrix. From the new sample matrix new values of the path response vectors and matrices are generated and so forth. At the same time, the estimated data signals $x^i$ and $y^i$, that would result from the estimated path vectors are analyzed for convergence on the input data signals. The desired result is the most likely underlying signal (unconstrained) that in a mean-squared-error sense would yield the estimated $x^i$, $y^i$, $c^i$, and $d^i$ vectors. This is the most reasonable match in view of the constraints placed on the system by the initial estimates.

For the present iterative process, a performance criterion $J_i$ can be established which is used to indicate when the process has achieved the maximum likelihood solution or estimation of the underlying signal and the path impulse-response coefficients. The method of the invention seeks to minimize the value of the measurement estimation error in estimating observable measurements.

The $i^{th}$ measurement-estimation error $J_i$ is defined as the difference between the estimated signal vectors and the actual signal vectors and by the relationship:

$$J_i = (x^o - x^i)^T(x^o - x^i) + (y^o - y^i)^T(y^o - y^i)$$

for a two-input-signal system, and as:

$$J_i = (^o - x^i)^T(x^o - x^i) + (y^o - y^i)^T(y^o - y^i) + \ldots + (n^o - n^i)^T(n^o - n^i)$$

for an N-input-signal system, where the measurement-estimation vectors are given by the relationships:

$$x^i = [S^i]c^i = [C^i]s^i,$$
$$y^i = [S^i]d^i = [D^i]s^i,$$
$$\vdots$$
$$n^i = [S^i]z^i = [Z^i]s^i.$$

At the beginning of each $i^{th}$ iteration, an unconstrained approximation for the reference function, $r^{i-1}$, is generated. A nonlinear function, $F(r^{i-1})$, is used to compute $s^i$ (the $i^{th}$ estimate of $s^o$) from $r^{i-1}$. A pseudoinverse is computed for the matrix $[S^i]$ which is used to estimate new values for the impulse response vectors $c^i$ and $d^i$, and their respective matrices $[C^i]$ and $[D^i]$. Using these values, estimates, $x^i$ and $y^i$ of the signal inputs $x^o$ and $y^o$ are generated. The value of $J_i$ can then be computed to determine how divergent the new estimated data is from the actual input signal sample data. If $J_i$ is not a minimum, the next value of $r^i$ is determined from the estimates and the iteration started again.

A useful method of minimizing $J_i$ is to take its derivative with respect to the input signal impulse response coefficients. In the present example, derivatives are taken with respect to $c^i$ and $d^i$, and the partial derivatives are set equal to zero so as to zero the vector as in:

$$\partial J_i/\partial c^i = -2[S^i]^T\{x^o - [S^i]c^i\} = 0$$

and $$\partial J_i/\partial d^i = -2[S^i]^T\{y^o - [S^i]d^i\} = 0$$

Solving for the $i^{th}$ estimate for the X-axis signal-propagation filter coefficients, yields:

$$c^i = [S^i]^* x^o,$$

and for the Y-axis coefficients:

$$d^i = [S^i]^* y^o;$$

where the pseudoinverse of the matrix $[S^i]$ is defined by the relationship:

$$[S^i]^* = \{[S^i]^T[S^i]\}^{-1}[S^i]^T$$

This is the Penrose inverse matrix formulation for the pseudoinverse, and avoids problems otherwise encountered when using non-square matrices in inversion processing.

The resulting $i^{th}$ vector estimates are the optimum (in the minimum-mean-squared-error sense) filter vectors, $c^i$ and $d^i$, from which the matrices $[C^i]$ and $[D^i]$ can be formed using the $i^{th}$ signal source estimate $s^i$. If $J_i$ has stopped decreasing in value between successive iterations, the process may be terminated and the latest values for the filter vectors used as the optimal values.

The optimized values of $c^i$ and $d^i$, are in turn then used to generate a new value for $r^i$ which can be used to minimize another performance criteria $Q_i$, recalling that $r^{i-1}$ is the first approximation of $s^i$. A useful or preferred formulation for the criteria $Q_i$ is:

$$Q_i = \{x^o - [C^i]r^i\}^T\{x^o - [C^i]r^i\} + \{y^o - [D^i]r^i\}^T\{y^o - [D^i]r^i\}$$

The value of $Q_i$ is minimized by setting the derivative with respect to $r^i$ equal to zero, which yields:

$$\partial Q_i/\partial r^i = -2[C^i]^T\{x^o - [C^i]r^i\} - 2[D^i]^T\{y^o - [D^i]r^i\} = 0$$

and the solution for $r^i$ becomes:

$$r^i = \{[C^i]^T[C^i] + [D^i]^T[D^i]\}^{-1}\{[C^i]^T x^o + [D^i]^T y^o\}$$

Finally, using the new value for the reference vector, components, computed from the estimated path matrices, the value of $s^i = F(r^{i-1})$ is determined and a new iterative cycle begins.

Decreasing successive values of $Q_i$ indicate convergent performance. He could use the minimization of $Q_i$ as an indicator of convergence. Usually the best convergence that will be achieved is obtained when both $J_i$ and $Q_i$ are in stable limit cycles about their minima.

Figure 1:
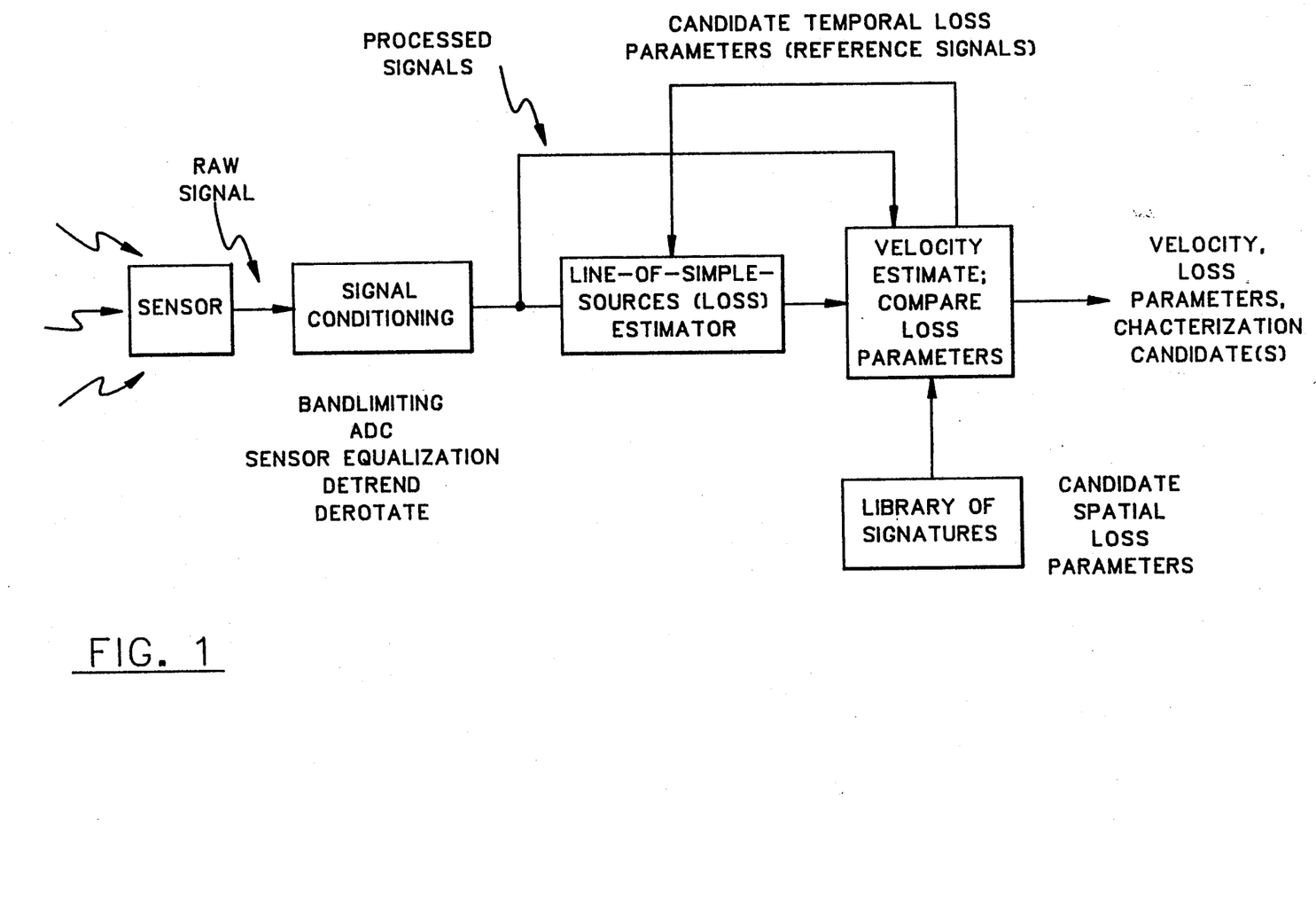
FIG. 1 illustrates an overview of the apparatus for deconvolving and estimating signals from a moving vehicle.
Figure 2:
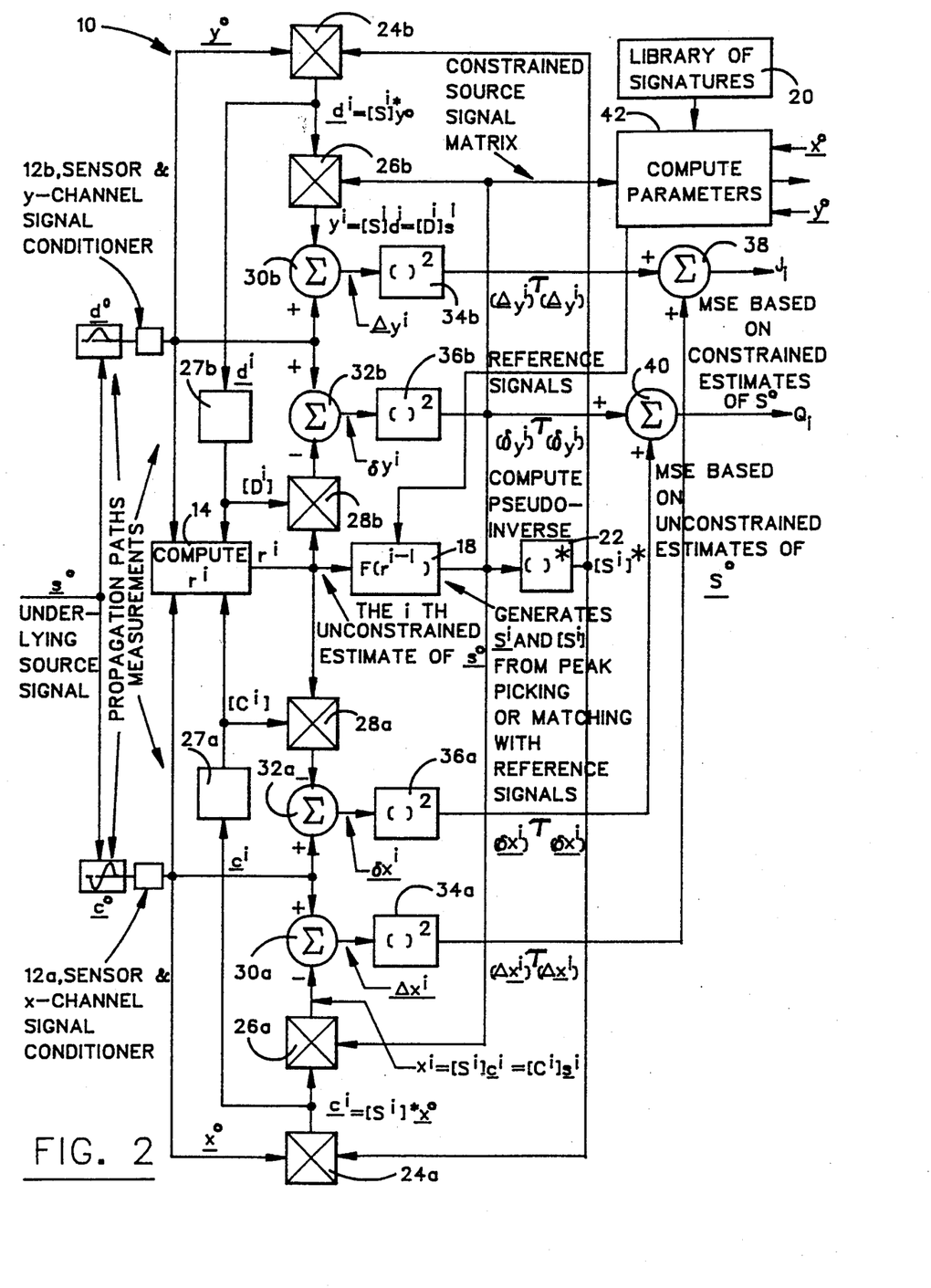
FIG. 2 shows a two-signal embodiment of FIG. 1 with the line-of-simple-sources estimator expanded.
Figure 3:
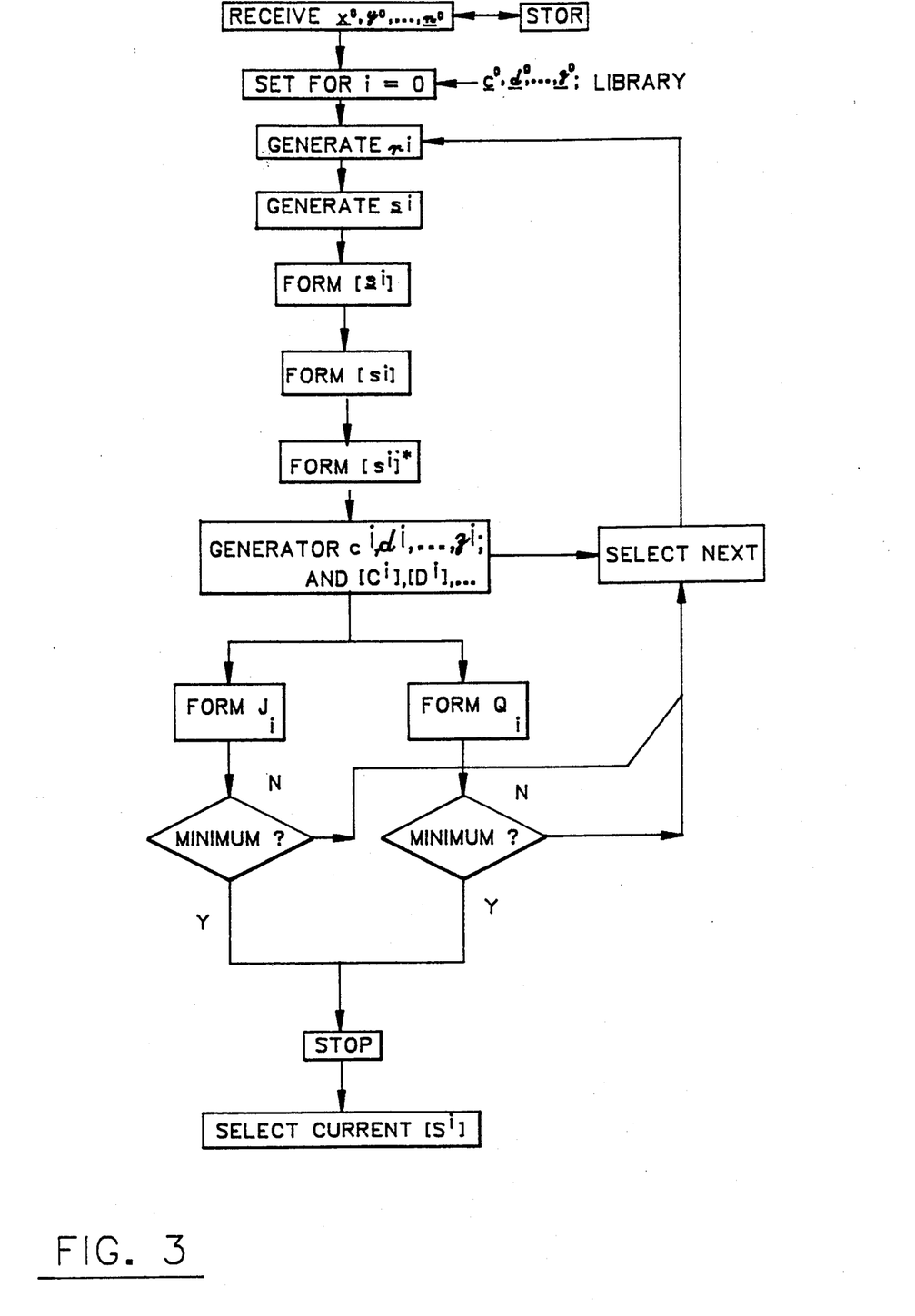
FIG. 3 represents the overall functional operation of the apparatus of FIG. 2.

An overview block diagram of an iterative deconvolver estimator constructed and operating according to the invention is shown in FIG. 1 and is expanded in FIG. 2. A stepwise method of operation for the apparatus is illustrated in FIG. 3.

FIG. 1 shows one aspect of the invention which is a combination of prior-art sensors, prior-art signal conditioning, and hardware or software realization of the novel iterative deconvolver (ID) identifier which generates the temporal output LOSS (line of simple sources, a sequence of weighted impulses) model. The ID also includes a library of spatial LOSS signatures of candidate vehicles that we wish to identify, a velocity computation from the signal-conditioned tiltmeter outputs, and distance-to-time conversion of the library of LOSS spatial signatures using the velocity computation results. We try to match our LOSS-model data within the ID and find the closest match.

Each sensor is a transducer which converts the physical excitation (usually a rotational ground motion, sometimes linear acceleration, acoustic energy, or moving magnetic moments) to an analog electrical signal. This electrical signal is contaminated in many ways, and must be improved through well known prior art signal conditioning.

The signal conditioning consists of an analog-to-digital converter (with any necessary antialias filtering), noise filtering, equalization (to remove instrument dynamics and therefore minimize errors in path modeling), offset removal and detrend (data does drift due to a variety of causes; this removes those effects), and derotation to orthogonalize the data (corrects for instrument misalignment).

The ID provides an impulse sequence to characterize the vehicle to be identified, and a set of impulse response characterizations of the propagation medium, one for each sensor output.

In FIG. 2, a signal deconvolver 10 is shown receiving at least two signal vectors $x^o$ and $y^o$ using the two signal input lines 12a and 12b, respectively. The input signals are received from the appropriate sensors or detectors and stored prior to use in the present invention and later provided as the appropriate input vectors. Memory or storage elements, such as RAM type memory, are useful for this purpose; such elements are not discussed further herein. In addition, application-specific signal preprocessing, prescaling, and filtering are not shown in detail for purposes of clarity.

The input $x^o$ and $y^o$ signal vectors are each generally transferred to four processing elements, reference generator 14, multiplier 24 (24a, 24b), and summation elements 30 and 32 (30a, 30b and 32a, 32b). The first element is the reference vector generator 14 which employs the input vectors to generate the values of each new reference vector $r^i$. As seen in the above equations, $r^i$ is normally based on computations which include values for the $[C^i]$ and $[D^i]$ matrices. However, at process initiation or during the first iterative step, the values for these matrices usually are unknown; therefore, an alternate method of computations may be employed.

In one preferred technique, the $x^o$ and $y^o$ vectors are used to generate the square root of the sum of the squares for the vector components. Many techniques may be used to compute such a quantity. For example, each vector component can be input to a squaring element, or to both inputs of a two input multiplier, to square each component. This product is then summed with the contents of a storage element which receives as its input the output from the summation element. At the appropriate time, the stored output, which is the sum of all squares, is then transferred to a square-root element to form the desired output.

Another preferred embodiment employs the same computational circuitry used to compute $r^i$ during the remaining iterative steps, but uses preselected values for $c^o$ and $d^o$. This approach is especially useful where the specific application involves historical data or a reasonable amount of knowledge about the system under analysis as where the application is repetitive or based on a substantial amount of previously observed data for the system behavior. In this situation the last computed values for $c^i$ and $d^i$ or other preferred starting values can be stored and then retrieved during the first processing cycle. Therefore, the reference generator 14 may include internal memory for $C^i$ and $D^i$, respectively.

Continuing with FIG. 2, the output from the reference generator 14, based on unconstrained input signals, is transferred to a mapping element 18 where it is mapped into an estimated or apparent signal source based on various system constraints. That is, based on the signals received, and the estimated path impulse response, a best fit is determined for an estimated signal source. If there is some Knowledge of what possible signal sequences or characteristics are likely to be observed, such as would be known from certain expected events, then this estimate can utilize templates of potential source signals or signal characteristics. These templates are stored in a library or memory element 20, speed normalized in element 42, and recalled for comparison. The closest fit comprises an estimated function $F(r^{i-1})$ for the signal source which is used to generate an estimated source sample signal vector $s^i$. Alternatively, little may be Known about the expected signal pulse patterns and another method will need to be used to estimate the sample signal. In the exemplary embodiment, it has been found useful to employ a peak-picking filter for the operation of the mapping function $F(r^{i-1})$ in the element 18 to generate an estimate of the pulse sequence being observed (giving rise to $x^o$ and $y^o$.

In this approach, known apparatus, such as (but not limited to) a 9-tap moving window filter, is used to determine the locations of peaks along the input reference signal. These peaks are assumed to represent approximate locations of the pulses in the original source pulse sequence. Therefore, the sample signal $s^i$ is generated using the location of the detected peaks as the pulse positions. An average ("local" average) is generated from the moving window filter. The peaks in the window which exceed this local average by an amount (which is a stored threshold reference) are used to trigger an output. Once the sample vector $s^i$ is generated, the sample matrix $[S^i]$ is compiled. The superscript reference on the mapping function element 18 is i−1 as opposed to i. This notation is used because the $i^{th}$ value for $[S^i]$ is actually based on the i−$1^{th}$ value for r, i.e., $r^{i-1}$.

The sample matrix output from the element 18 is transferred to a matrix inversion element 22, in which a pseudoinverse matrix of the input is generated. It is also transferred to multipliers 26 26a, 26b) as discussed below. In the inversion element 22, the sample matrix $[S^i]$ is transposed and postmultiplied by the non-transposed form; the inverse of the product is then postmultiplied by the transposed matrix $[Si]^i]^T$ to generate the desired pseudoinverse $[S^i]^*$.

Returning to input portion of FIG. 2, the input vectors $x^o$ and $y^o$ are also each transferred to one of two input multipliers 24a and 24b. They are premultiplied here by the pseudoinverse matrix $[S^i]^*$ to provide the path-response estimation vectors $c^i$ and $d^i$, respectively. The output of the multipliers 24a and 24b are provided as inputs to multipliers 26a and 26b, and to the reference generator 14 and to other multipliers 28a, 28b (through the matrix formers 27a, 27b). The multipliers 26 (26a, 26b) each receive the output of the mapping element 18 as a second input. This provides the product of the vectors and $c^i$ and $d^i$ premultiplied by the sample signal matrix $[S^i]$. The multipliers 28 (28a, 28b) each receive the output of the reference generator 14 as a second input. This provides the product of the matrices $C^i]$ and $[D^i]$ postmultiplied by the reference signal vector $r^i$. These products can be recognized as the two variations in computing estimation vectors $X^i$ and $y^i$.

At the same time, the input signal vectors are each transferred to one input of a pair of two input summation elements or adders 30 and 32 (30a, 30b and 32a, 32b). The product vector generated by the multiplier 26 is applied as a second input to the first summation element 30, and the product from the multiplier 28 is likewise applied as a second input to the summation element 32. The products from the multipliers are applied as subtracting or negative inputs and are subtracted from the input vectors in the summation elements 30 and 32. The resulting outputs from the summation elements 30 and 32 correspond to the measurement of the difference between the input signal vectors $x^0$ or $y^0$ and the two different estimations for the vectors $x^i$ or $y^i$. These are labeled in the figures as δx and δy, and Δx and Δy, respectively.

The outputs from the summation elements 30 and 32 (30a, 30b and 32a, 32b) are each squared, element by element, to provide the equivalent to the operations $(\Delta x^i)^T(\Delta x^i)$, $(\delta x^i)$, $(\delta x^i)^T(\delta x^i)$, $(\Delta y^i)^T(\Delta y^i)$, and $(\delta y^i)^T(\delta y^i)$, from the sum of all differences from 0 to P−1. These are then used in determining the values for the performance or convergence factors $J_i$ and $Q_i$. The squared products from all of the squaring elements 34 are summed together in a summation element 38, and all of the outputs from the squaring elements 36 are likewise summed in a summation element 40. The output from the element 38 represents the value for $J_i$ and the output from the element 40 represents $Q_i$.

After each iteration, the values of both $J_i$ and $Q_i$ are checked to observe for convergence to or limit cycle about a single solution and to verify the progress, and proper system behavior, for the iterations. These values represent a measure of the goodness-of-fit of the estimated source signal, and thus of the estimated input signals, to the input signals. During the first few iterations these values should decrease rapidly, unless the initially generated reference signal was a very close approximation to the source. Once these values reach minimum values, generally never zero, or simply stop decreasing in value, processing is terminated. Otherwise, the iterations continue, and there is no system output, until this condition is obtained.

The last computed values for $c^i$ and $d^i$ can be stored for later retrieval where desired in a memory or storage element, not shown, such as when the apparatus 10 is next used, as values for $c^o$ and $d^o$. The last known value for other signals such as $r^i$ or the $[C^i]$, $[D^i]$, and $[S^i]$ matrices could also be stored for later retrieval or analysis where desired.

Parameter computer 40 is employed to use the input vectors $x^o$ and $y^o$, and the sample vector output from the element 18 to compute signal parameters. An important one is the determination of the speed of a vehicle based on the estimated seismic source signals.

Figure 4:
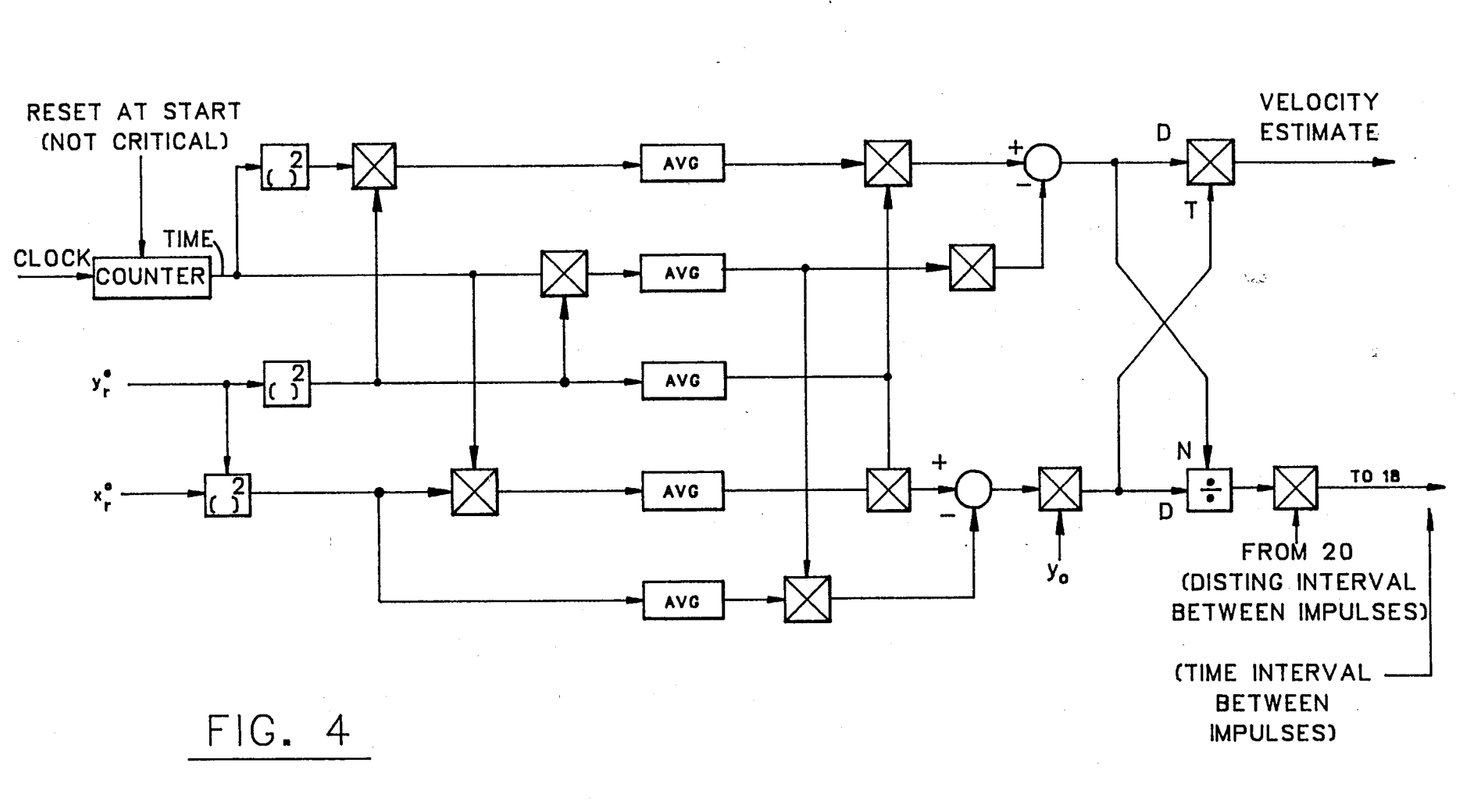
FIG. 4 shows the details of the velocity estimator.

FIG. 4 shows the details of the velocity estimator. The measurement sequence from the tiltmeters $x^o_p$ and $y^o_p$, are time weighted as shown and processed to provide a velocity estimate. The scaling parameter is $Y_o$, the distance between the closest-point of approach and the tiltmeter. The time weighting is not sensitive (except in roundoff error) to the exact reset time of the counter. Ideally it should be reset just before the tiltmeter signal sequence begins, but, again, the timing is not terribly critical. The library data (spatial domain LOSS models) from element 20 are converted to time-domain models by velocity scaling, and applied to element 18.

The inventive technique can extract a great deal of useful information from an input signal if the basic assumption regarding the impulse sequence nature of the signal source is true. If a general understanding or expectation of the signal source is not available, then the technique may provide less useful output than desired. The main limitation of the system is the bandwidth of the sensors or instrumentation used to acquire the input signals.

What has been described is a new technique for deconvolving a signal (at a sensor) into its source signal (at a moving vehicle). Once the source signal has been determined, the vehicle can be classified (both as a vehicle and, using length, weight distribution, etc., as a class of vehicle) by any of a number of techniques, as are well known in the art. The deconvolution technique is highly efficient and economical to implement, and provides a highly accurate estimation of the source signal being monitored.

The foregoing description of preferred embodiments has been presented for purposes of illustration and description. It is not intended to be exhaustive nor to limit the invention to the precise forms disclosed, and many modifications and variations are possible in light of the above teaching. The embodiments were chosen and described to best explain the principles of the invention and its practical application to thereby enable others skilled in the art to best utilize the invention on in various embodiments and with various modifications as are suited to the particular use contemplated. It is intended that the scope of the invention be defined by the claims and their equivalents.

What is claimed is:

1. A method for classifying a moving vehicle which produces a source signal propagating along at least two signal paths, each path having an impulse response duration, the method comprising the steps of:
   (a) sensing, at a minimum of one locations remote from the vehicle, a set of at least two received input signals propagated from the source signal along a minimum of two signal paths, and preprocessing such signals into input signal vectors xO, yO, ..., zO, one vector from each sensor;
   (b) collecting samples from each received input signal;
   (c) for the set of received input signals:
     (1) forming each of the received input signals into blocks of M+N−1 contiguous samples, where M is the duration of the source signal and N is the longest impulse response duration of any path, M and N both being measured in sampling intervals;
     (2) measuring the energy of each block;
     (3) selecting a block which has the most energy; and
     (4) storing the input signal vectors, xO, yO, ..., zO, received during said most energy block;
   (d) combining a plurality of components of the input signal vectors, xO, yO, ..., zO, by a root-sum-square technique, thereby producing a zeroth M+N−1 sample unconstrained reference signal vector, rO; and setting an index i to have a value equal to one;
   (e) selecting an (i−1)st unconstrained reference signal vector, r(i−1), for use in an ith iteration;
   (f) forcing to zero all values of the (i−1)st unconstrained reference signal vector, r(i−1), except those which exceed a computed threshold, thereby producing an ith zeroed signal vector;
   (g) discarding N−1 end samples of the ith zeroed signal vector such that the remaining M contiguous samples have more energy than any other grouping of M contiguous samples, thereby forming an ith constrained source signal vector, si;
   (h) forming an tth constrained source signal matrix, [Si], from the ith constrained source signal vector, si, by setting each element of the ith constrained source signal matrix, [Si], at row p and column n to zero if n is greater than p or p is greater than M−1+n, otherwise setting that element equal to the (p−n)th element of the corresponding ith constrained source signal vector, si;

(i) premultiplying the ith constrained source signal matrix, [Si], by its transpose to form an ith product matrix, then postmultiplying the inverse of the ith product matrix by the transpose of the ith constrained source signal matrix, [Si], to form a pseudoinverse of the ith constrained source signal matrix, [Si];

(j) postmultiplying the pseudoinverse by each of the received input signal vectors, xO, yO ... zO, to form an ith set of signal path impulse response estimation vectors, ci, di, ... , ei;

(k) forming an tth set of signal path estimation matrices, [Ci], [Di], ... , Ei, from the corresponding signal path impulse response estimation vectors, ci, di, ..., ei, by setting each element of the ith signal path estimation matrices, [Ci], [Di9 ..., Ei, at row p and column m to zero if m is greater than p or p is greater than N−1+m, otherwise setting that element equal to the (p-m)th entry of the corresponding signal path impulse response estimation vector, ci, di, ... , ei;

(l) generating an tth set of input signal estimate vectors, xi, yi, ... , zi, of the corresponding values of the input signal vectors, xO, yO, ..., zO, by a step selected from the group consisting of the steps of:
  (1) postmultiplying the ith constrained source signal matrix, [Si], by the corresponding signal path impulse response estimation vectors, ci, di, ... , ei; and
  (2) postmultiplying the corresponding ith set of signal path estimation matrices, [Ci], [Di], ... , Ei, by the ith constrained source signal vector, si;

(m) obtaining an ith unconstrained reference signal vector, ri, by postmultiplying the inverse of an ith matrix [Mi] by a vector vi; the ith matrix [[]Mi] consisting of the sum of all ith signal path estimation matrices, [Ci], [Di]. .. , Ei, premultiplied by their respective transposes; and the vector vi consisting of the sum of all ith signal path estimation matrix transposes postmultiplied by their respective input signal vectors, xO, yO, ... , zO;

(n) generating a first group of ith iteration estimation errors by subtracting from the input signal vectors, xO, yO ... , zO, the corresponding input signal estimate vectors, xi, yi, ... , zi;

(o) computing a first evaluation of estimator ith iteration performance by summing the squares of all scalar components of the first group of ith iteration estimation errors;

(p) generating a second group of ith iteration estimation errors by subtracting from the input signal vectors, xO, yO ... , zO, the corresponding ith signal path estimation matrices, [Ci], [Di]. ... , Ei, each postmultiplied by the ith unconstrained reference signal vector, ri;

(q) computing a second evaluation of estimator ith iteration performance by summing the squares of all scalar components of said second group of ith iteration estimation errors;

(r) terminating the procedure if at least one of the first and second evaluations of the ith iteration performance indicate no further reduction in estimation errors, otherwise incrementing the value of i by one and repeating steps (e) through (r);

(s) selecting the ith constrained source signal vector, si, as the deconvolved source signal; and (t) transferring the deconvolved source signal to an analysis apparatus.

2. The method of claim 1 wherein the step of forming the ith constrained source signal vector, si, further comprises the steps of:
  (a) comparing the (i-1)st unconstrained reference signal vector, r(i−1), with a plurality of prestored sample source signal vectors; and
  (b) selecting one of the prestored sample source signal vectors as a best fit match to the (i−1)st unconstrained reference signal vector, r(i−1), as the ith constrained source signal vector, si.

3. The method of claim 1 wherein the step of forming a constrained reference signal further comprises the steps of:
  (a) performing peak picking on the (i−1)st unconstrained reference signal vector, r(i−1), so as to estimate locations of pulse peaks in the constrained source signal vector, si; and
  (b) generating an output pulse sequence having pulses spaced apart relative to each other corresponding to locations for the pulse peaks.

4. The method of claim 1, wherein the procedure terminating step (r) is conditioned on both of the first and second evaluations of the ith iteration performance indicating no further reduction in estimation errors.

5. The method of claim 4 wherein the step of forming the ith constrained source signal vector, si, further comprises the steps of:
  (a) comparing the (i−1)st unconstrained reference signal vector, r(i−1), with a plurality of prestored sample source signal vectors; and
  (b) selecting one of the prestored sample source signal vectors as a best fit match to the (i−1)st unconstrained reference signal vector, r(i−1), as the ith constrained source signal vector, si.

6. The method of claim 4 wherein the step of forming a constrained reference signal further comprises the steps of:
  (a) performing peak picking on the (i−1)st unconstrained reference signal vector. r(i−1). so as to estimate locations of pulse peaks in the constrained source signal vector, si; and (b) generating an output pulse sequence having pulses spaced apart relative to each other corresponding to locations for the pulse peaks.

* * * * *